United States Patent [19]

Sloss et al.

[11] Patent Number: 5,775,100
[45] Date of Patent: Jul. 7, 1998

[54] DUAL INLET MUFFLER CONNECTION

[75] Inventors: Jeffrey David Sloss, Grosse Pointe Woods; Thomas Edward Teasdale, Troy, both of Mich.

[73] Assignee: Ford Global Technologies, Inc., Dearborn, Mich.

[21] Appl. No.: 695,812

[22] Filed: Aug. 5, 1996

[51] Int. Cl.⁶ .................. F01N 3/24; F01N 7/04
[52] U.S. Cl. .................. 60/299; 60/323; 181/238
[58] Field of Search .................. 60/299, 302, 312, 60/313, 323; 181/238, 240; 285/121.2, 121.3, 121.7, 261

[56] References Cited

U.S. PATENT DOCUMENTS

| | | | |
|---|---|---|---|
| 2,370,259 | 2/1945 | Rippingille | 60/313 |
| 3,144,309 | 8/1964 | Sparrow | 422/115 |
| 3,486,773 | 12/1969 | Deplante | 285/121.7 |
| 3,783,619 | 1/1974 | Alquist | 60/288 |
| 3,988,890 | 11/1976 | Abthoff et al. | 60/274 |
| 3,995,423 | 12/1976 | Aoki et al. | 60/288 |
| 4,023,360 | 5/1977 | Wössner et al. | 60/277 |
| 4,127,288 | 11/1978 | de Vries | 285/121.3 |
| 4,134,261 | 1/1979 | Iizuka et al. | 60/299 |
| 4,181,332 | 1/1980 | Neumann | 285/334.4 |
| 4,277,092 | 7/1981 | Viers | 285/263 |
| 4,465,308 | 8/1984 | Martini | 285/148.25 |
| 5,067,319 | 11/1991 | Moser | 60/288 |
| 5,248,859 | 9/1993 | Borla | 181/238 |
| 5,290,974 | 3/1994 | Douglas et al. | 181/228 |
| 5,351,481 | 10/1994 | Flugger | 60/313 |
| 5,449,499 | 9/1995 | Bauer et al | 422/176 |
| 5,519,994 | 5/1996 | Hill | 60/313 |
| 5,603,216 | 2/1997 | Guile | 60/288 |
| 5,701,737 | 12/1997 | Branik et al. | 60/299 |

FOREIGN PATENT DOCUMENTS

| | | |
|---|---|---|
| 0 661 098 A2 | 7/1995 | European Pat. Off. . |
| 1 275 772 | 5/1972 | United Kingdom . |
| 2 240 486 | 8/1991 | United Kingdom . |
| 2 238 838 | 12/1991 | United Kingdom . |
| 95/18292 | 7/1995 | WIPO . |

OTHER PUBLICATIONS

S.N. 08/484,617; Filed Jun. 8, 1995; In-Line Adsorber System.

*Primary Examiner*—Willis R. Wolfe
*Attorney, Agent, or Firm*—Donald A. Wilkinson

[57] ABSTRACT

An exhaust system for use with the engine (10) of a vehicle. The exhaust system includes a pair of catalytic converters (18) connected to separate exhaust streams, with each catalytic converter (18) including an outlet pipe (22) extending therefrom. A dual inlet muffler (24) includes a pair of inlet pipes (26) spaced to mount to the outlet pipes (22). A slip fit joint (32) connects one of the outlet pipes to an inlet pipe and a ball and flare joint (34) connects the other of the outlet pipes to the other inlet pipe; thus allowing for alignment and proper mounting of the exhaust system to a vehicle.

2 Claims, 1 Drawing Sheet

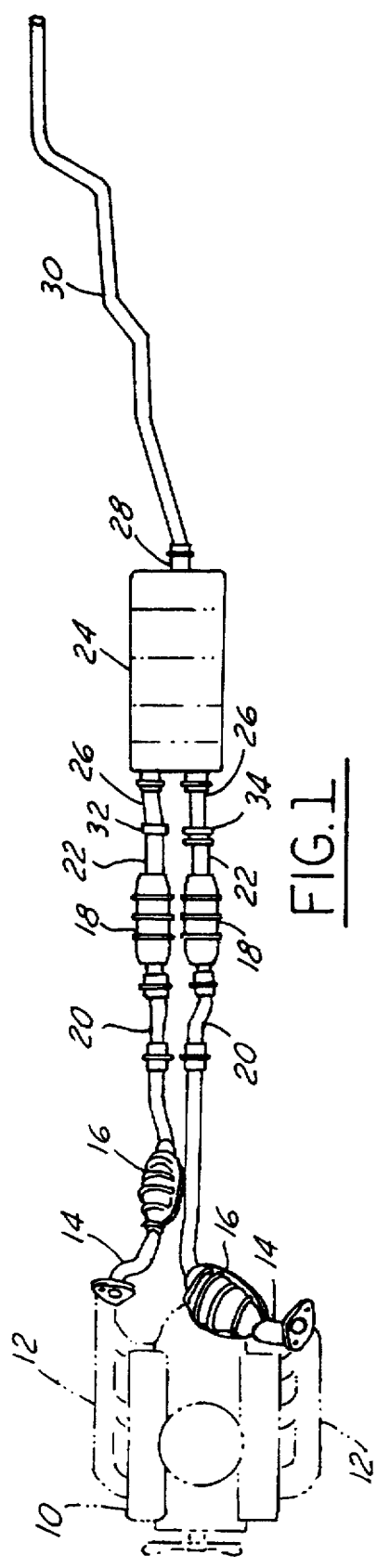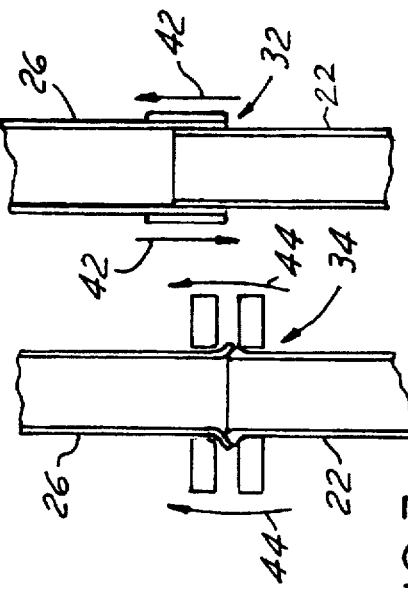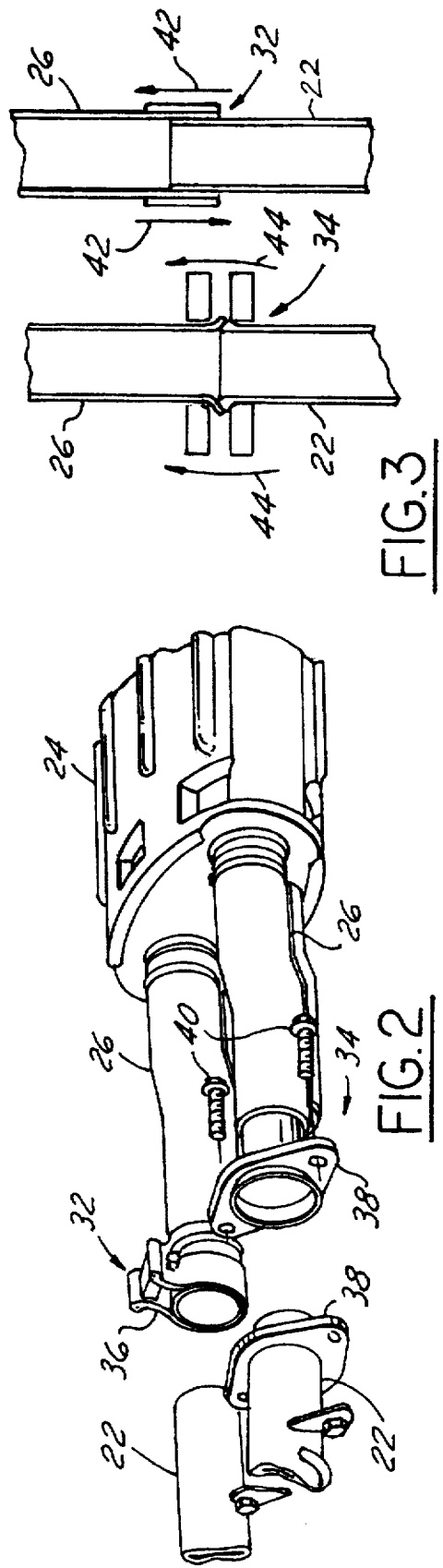

10

DUAL INLET MUFFLER CONNECTION

FIELD OF THE INVENTION

The present invention relates to mufflers and other exhaust components used in vehicle exhaust systems and more particularly to the attachment mechanisms between mufflers and the exhaust components.

BACKGROUND OF THE INVENTION

The demand to increase the fuel economy and performance of today's motor vehicles has forced current automotive manufacturers to continue efforts to reduce the parasitic losses associated with the exhaust system. These losses represent the percentage of engine horsepower required to force the exhaust gasses through the components that make up the exhaust system.

One configuration that can be employed to reduce the exhaust powerless is to incorporate dual inlets into the muffler coming from separate catalytic converters. This dual inlet muffler configuration approaches the efficiency of a true dual exhaust system, while at the same time reduces the cost associated with a true dual exhaust system. The different systems being a single muffler system with one pipe connecting to a single entrance to a single muffler, a true dual muffler system which has two separate exhaust pipes, each connecting to a separate one of two mufflers having only one inlet each and the dual inlet muffler system.

In a typical single muffler or true dual muffler system, a ball and flare joint is used. The ball and flare joint allows for the motion of the exhaust system at the joint about two axes. This allows the exhaust pipes to be positioned in the desired location during vehicle assembly. However, a system with two ball and flare joints and a single muffler would only allow motion about a single axis, which, due to component and assembly process variations, may allow the system to be positioned where clearance or noise and vibration concerns may arise.

Thus, a significant disadvantage with a dual inlet muffler system is that it is more susceptible to difficulties while assembling the exhaust system to the vehicle than the other two types of systems, due to variations in components which may cause the pipes to be positioned in undesirable locations, or may cause a preload in the exhaust hanger system, both of which can lead to undesirable noise and vibrations. Furthermore, the exhaust system must have adequate strength and allow for ease of service for repairs.

A need arises then for a simple and inexpensive way to assemble the two pipes to the dual inlet muffler, during assembly of the exhaust system to the vehicle, while minimizing the risk that the exhaust assembly is assembled to the vehicle in an undesirable position.

SUMMARY OF THE INVENTION

In its embodiments, the present invention contemplates an exhaust system for use with a vehicle engine. The exhaust system comprises a first and a second catalytic converter, each having an inlet pipe and an outlet pipe extending therefrom, and means for directing exhaust gasses from the engine to the inlet pipes of the first and the second catalytic converters The exhaust system further comprises a muffler having a first and a second of inlet pipe extending therefrom. A ball and flare joint joins the outlet pipe of the first catalytic converter to the first inlet pipe of the muffler. A slip fit joint joins the outlet pipe of the second catalytic converter to the second inlet pipe of the muffler.

Accordingly, an object of the present invention is to allow for ease of alignment of two converter outlet pipes to the intake end of a dual inlet muffler while installing the exhaust system on a vehicle.

An advantage of the present invention is that manufacturing tolerances can easily be accounted for, and adjustments made about multiple axes, during the assembly of the muffler to the converter outlet pipes while minimizing the additional expense associated with complex coupling mechanisms.

BRIEF DESCRIPTION OF THE DRAWINGS

FIG. 1 is a plan view of a vehicle exhaust system as it would look fully assembled to the bottom of a typical vehicle, in accordance with the present invention;

FIG. 2 is a perspective, partially exploded view of a portion of a pair of converter outlet pipes and muffler; and FIG. 3 is a schematic diagram illustrating the two joints and the adjustment directions of each.

DETAILED DESCRIPTION OF THE PREFERRED EMBODIMENTS

One of the typical configurations for an engine 10 used to power a vehicle is a V-type engine where cylinders are arranged in two banks. Each bank of cylinders, then, will have its own exhaust manifold 12 and down pipe 14. In a conventional single muffler system, the two pipes are then joined, forming one exhaust stream; in a conventional true dual exhaust system, the two exhaust streams remain separate throughout. Here, in order to provide for a more efficient exhaust system, the exhaust flow from the two banks is kept separate through an optional first set of catalytic converters 16 and a second set of catalytic converters 18, each connected by a separate exhaust pipe 20. The exhaust stream is then joined in a muffler, as discussed below.

Each of the catalytic converters in the second set 18 includes, extending from its outlet end, converter outlet pipes 22. These outlet pipes 22 can be integral with the converter or separate pieces mounted to the converters 18. A muffler 24 mounts just aft of the outlet pipes 22 and includes a pair of forward protruding muffler inlet pipes 26. The muffler 24 also includes an outlet pipe 28 which connects to a tailpipe 30.

The converter outlet pipes 22 connect to the muffler inlet pipes 26 via two separate joints. The first joint is a slip fit joint 32 and the second joint is a ball and flare joint 34. The slip fit joint 32 is designed such that the respective converter outlet pipe 22 has a slightly smaller nominal outer diameter than the nominal inner diameter of the corresponding muffler inlet pipe 26. Mounted on this muffler inlet pipe 26 is a clamp 36, preferably a slip fit clamp. After the converter outlet pipe 22 is inserted in the corresponding muffler inlet pipe 26, the clamp 36 is tightened, sealing the two pipes together. The ball and flare joint 24 is designed such that the respective converter outlet pipe 22 is ball shaped on its end and the corresponding muffler inlet pipe 26 is flared to receive the ball. Then, when a pair of brackets 38 are fastened together with bolts 40, the two pipes are secured together.

FIG. 3 illustrates the directions of adjustments that each of the joints allows for. The slip fit joint 32 allows for a shortening or lengthening relative movement as indicated by arrows 42. The ball and flare joint 34 allows for a back and forth rotational relative movement as indicated by arrows 44.

While certain embodiments of the present invention have been described in detail, those familiar with the art to which this invention relates will recognize various alternative designs and embodiments for practicing the invention as defined by the following claims.

We claim:

1. An exhaust system for use with a vehicle engine comprising:

a first and a second catalytic converter, each having an inlet pipe and an outlet pipe extending therefrom;

means for directing exhaust gasses from the engine to the inlet pipes of the first and the second catalytic converters;

a muffler having a first and a second of inlet pipe extending therefrom;

a ball and flare joint joining the outlet pipe of the first catalytic converter to the first inlet pipe of the muffler; and a slip fit joint joining the outlet pipe of the second catalytic converter to the second inlet pipe of the muffler.

2. The exhaust system of claim 1 wherein the slip fit joint includes a slip fit clamp for securing the outlet pipe of the second catalytic converter to the inlet pipe.

* * * * *